(12) United States Patent
Paturzo et al.

(10) Patent No.: US 10,011,776 B2
(45) Date of Patent: Jul. 3, 2018

(54) MULTI-STRUCTURED REACTOR MADE OF MONOLITHIC ADJACENT THERMOCONDUCTIVE BODIES FOR CHEMICAL PROCESSES WITH A HIGH HEAT EXCHANGE

(71) Applicant: ENI S.P.A., Rome (IT)

(72) Inventors: Marco Paturzo, Milan (IT); Mauro Favaretto, Salzano-Venezia (IT); Marzio Piazza, Concorezzo-Monza Brianza (IT); Pio Forzatti, Monza (IT); Gianpiero Groppi, Segrate-Milano (IT); Luca Lietti, Cantu Como (IT); Enrico Tronconi, Arcore (IT); Carlo Giorgio Visconti, Basiglio (IT)

(73) Assignee: Eni S.p.A., Rome (IT)

( * ) Notice: Subject to any disclaimer, the term of this patent is extended or adjusted under 35 U.S.C. 154(b) by 0 days.

(21) Appl. No.: 14/758,288

(22) PCT Filed: Dec. 27, 2013

(86) PCT No.: PCT/EP2013/078083
§ 371 (c)(1),
(2) Date: Jun. 29, 2015

(87) PCT Pub. No.: WO2014/102350
PCT Pub. Date: Jul. 3, 2014

(65) Prior Publication Data
US 2015/0353838 A1    Dec. 10, 2015

(30) Foreign Application Priority Data
Dec. 28, 2012 (IT) .............................. MI2012A2251

(51) Int. Cl.
*B01J 19/24* (2006.01)
*C10G 2/00* (2006.01)

(52) U.S. Cl.
CPC .......... *C10G 2/341* (2013.01); *B01J 19/2485* (2013.01); *C10G 2/332* (2013.01);
(Continued)

(58) Field of Classification Search
CPC ....... C10G 2/341; C10G 2/332; B01J 19/2485
(Continued)

(56) References Cited

U.S. PATENT DOCUMENTS 4,743,578 A * 5/1988 Davidson ................. B01J 8/008
428/116
5,254,840 A    10/1993 Thompson
(Continued)

FOREIGN PATENT DOCUMENTS

| EP | 756895 | 3/2000 |
|---|---|---|
| WO | WO2008074496 | 6/2008 |
| WO | WO2010130399 | 11/2010 |

OTHER PUBLICATIONS

International Search Report and Written Opinion dated Apr. 23, 2014 for PCT/EP2013/078083.
(Continued)

*Primary Examiner* — Huy-Tram Nguyen
(74) *Attorney, Agent, or Firm* — Abel Law Group, LLP (57) ABSTRACT

A multi-structured tubular element for producing a reactor for effecting exothermic/endothermic chemical reactions, comprises two or more monolithic thermoconductive bodies, assembled together so that each has a part of the side surface interfaced with the side surface of one or more monolithic thermoconductive bodies adjacent thereto, so as to form as a whole, a honeycomb structure containing a plurality of longitudinal channels extending from one end to the other of said tubular element, suitable for being filled with a granular catalytic solid.

20 Claims, 3 Drawing Sheets

(52) U.S. Cl.
CPC .. *B01J 2219/243* (2013.01); *B01J 2219/2404* (2013.01); *B01J 2219/2407* (2013.01); *B01J 2219/2411* (2013.01); *B01J 2219/2434* (2013.01); *B01J 2219/2443* (2013.01); *B01J 2219/2445* (2013.01); *B01J 2219/2446* (2013.01); *Y10T 29/49828* (2015.01)

(58) Field of Classification Search
USPC ........................................................ 422/222
See application file for complete search history.

(56) References Cited

U.S. PATENT DOCUMENTS

| | | | |
|---|---|---|---|
| 5,645,613 | A | 7/1997 | Benham et al. |
| 6,881,703 | B2 | 4/2005 | Cutler et al. |
| 7,531,145 | B2* | 5/2009 | Aoki .................. B01D 39/2068 422/180 |
| 7,678,343 | B2 | 3/2010 | Carmello et al. |
| 2002/0038062 | A1 | 3/2002 | Carmello et al. |
| 2003/0100448 | A1* | 5/2003 | Cutler .................. B01J 19/2485 502/345 |
| 2004/0076794 | A1* | 4/2004 | Hijikata ............. B01D 39/2068 428/116 |
| 2004/0096625 | A1* | 5/2004 | Hijikata ............. B01D 39/2068 428/116 |
| 2005/0142049 | A1* | 6/2005 | Amsden .................. B01J 8/002 422/219 |
| 2009/0035512 | A1* | 2/2009 | Masukawa ............ C04B 35/573 428/116 |
| 2010/0154640 | A1 | 6/2010 | Hagg et al. |
| 2012/0184631 | A1 | 7/2012 | Iovane et al. |

OTHER PUBLICATIONS

"Catalysis Science and Technology," vol. 1, Springer-Verlag, New York (1981).
Bauser, et al., "Extrusion," ASM International Ed. (2006).
Saha, "Aluminum extrusion technology," ASM International Ed. (2000).

* cited by examiner

MULTI-STRUCTURED REACTOR MADE OF MONOLITHIC ADJACENT THERMOCONDUCTIVE BODIES FOR CHEMICAL PROCESSES WITH A HIGH HEAT EXCHANGE

The present invention relates to a multi-structured reactor for chemical processes with a high heat exchange.

More specifically, the present invention relates to a reactor for effecting exothermic or endothermic chemical reactions, especially in the presence of a heterogeneous catalyst, attributed to a composition of monolithic parts.

Even more specifically, the present invention relates to a multi-structured reactor for carrying out the Fischer-Tropsch reaction starting from synthesis gas.

In the present text, all the information and operating and non-operating conditions indicated should be considered as being preferred unless explicitly specified.

As is known, the term "Fischer-Tropsch process or reaction" indicates processes for the preparation of mixtures of prevalently hydrocarbon compounds and in some cases oxygenated aliphatic compounds, or a mixture thereof, by direct synthesis from mixtures of hydrogen and carbon monoxide with a molar ratio $H_2/CO$ ranging from 1 to 3 (synthesis gas) in the presence of suitable solid catalysts, normally comprising transition metals of groups 8 to 10 of the periodic table. In these processes, the chemical reaction is developed in substantially three-phase systems in which a gaseous phase flows in contact with the solid catalyst and the reaction product prevalently consists of liquid and gaseous hydrocarbons, at the reaction temperature and water as by-product.

The considerable exothermicity of the Fischer-Tropsch reaction (35-45 kcal/mole) makes the presence of heat exchange devices essential for controlling the temperature within the operative limits of the reaction and to prevent the formation of local hot spots, responsible for the deterioration of the catalyst.

International patent application WO 2008/074496, for example, proposes effecting the Fischer-Tropsch reaction in reactors defined as "Slurry Bubble Columns" in which the Fischer-Tropsch reaction is developed in three-phase systems in which the synthesis gas gurgles, in the form of bubbles, in a suspension of the catalyst in the reaction liquid. The reaction system, continuously stirred by the rising gas flow, allows the reaction heat to be easily removed by means of a tube-based heat exchanger, immersed in the liquid, in which a cooling fluid, for example water, circulates.

Although reactors of the Slurry Bubble Column type allow extremely favourable reaction yields and an effective temperature control, they have a series of operative drawbacks such as, for example, the necessity of having to separate the reaction product from the catalyst in suspension, recovering and recycling the latter, in addition to the difficulty of managing the fluid-dynamic conditions in the reactor in order to have a homogeneous dispersion of the catalyst.

Furthermore, last-generation industrial reactors for the Fischer-Tropsch synthesis with a catalyst in suspension are characterized by large dimensions, with cylindrical equipment having a height in the order of 60 meters and a diameter in the order of 10 meters. The construction and management of these reactors and in particular their maintenance may not be easy to handle.

An alternative to Slurry Bubble Column-type reactors is represented by fixed-bed reactors. These reactors essentially consist of a device comprising a casing or mantle and a pair of closing elements, upper and lower, in which there are generally feeding means of the reactants and discharging means of the reaction products. A plurality of tubes is inserted inside the mantle, each of which is filled with catalyst, for example, in the form of pellets.

The reacting gas, for example, synthesis gas, flows inside the tubes, enters into contact with the catalytic particles and reacts. The reaction heat is removed by a continuous flow of cooling fluid, for example water, which occupies the free volume inside the mantle.

The main limits of the fixed-bed configuration substantially depend on the intraparticle mass transfer (responsible, for example, for a low activity and selectivity towards the liquid product, in the case of the Fischer-Tropsch reaction) and radial heat transfer inside the reactor, which can create local hot spots with potential deactivation of part of the catalyst, which may be such as to not allow it to carry out the reaction at high rates. Finally, fixed-bed reactors are characterized by an extremely low specific productivity (per time unit and volume unit of catalyst used). In order to guarantee adequate production volumes, extremely high quantities of catalyst must therefore be used, and consequently very large dimensions of the reactor.

An alternative solution to traditional fixed-bed or suspension reactors is represented by particular multi-tubular reactors, as described, for example, in published US patent application 2005/0142049, according to which exothermic reactions, such as the selective oxidation of benzene or n-butane to maleic anhydride, the oxidation of o-xylene to phthalic anhydride or the Fischer-Tropsch synthesis, or endothermic reactions, such as the steam-reforming of hydrocarbons to synthesis gas, can be carried out in multi-tubular reactors loaded with conductive monolithic catalysts. These reactors comprise a container in which a plurality of tubes are positioned, forming a tube-bundle. Each tube comprises a metallic honeycomb monolithic structure which supports the catalyst. Analogous continuous monolithic structures in which there is a plurality of parallel channels whose walls are coated with catalyst, are also described in U.S. Pat. No. 6,881,703 and U.S. Pat. No. 7,678,343.

The catalytic material is distributed in thin layers on the internal walls of the channels of the monolithic structure by means of the deposition technique commonly known as "washcoating", so as to be in contact with the reactants flowing in each channel during the process.

The monolithic structure guarantees a good heat exchange with the thermo-regulating fluid circulating in the container outside the tube, due to the fact that, as the material of the monolith is characterized by a good thermal conductivity, it favours radial heat transfer.

The limit of multi-tubular reactors with washcoated monolithic catalysts lies in the fact that the availability of the active catalytic phase per volume unit of the reactor is lower than that of traditional reactors. For this reason, in order to have significant productivities, resort must be made in practice to larger reaction volumes. Furthermore, these reactors do not allow an easy change of catalyst once this has become exhausted or deactivated.

More recently, published international patent application WO 2010/130399 (in the name of the Applicant) proposes a monolithic reactor with more reduced dimensions thanks to a higher volumetric density of the active phase of the catalyst and a more efficient removal system of the reaction heat. This reactor is based on tubular monoliths comprising, in a continuous metallic matrix having a high conductivity, a series of longitudinal channels having suitable dimensions, filled with catalyst in granule form. Although satisfactory results have been obtained with this reactor, especially in carrying out the Fischer-Tropsch reaction with a reduced encumbrance of the plant installations, difficulties have been encountered in the production phase of the tubular monoliths, in terms of limited dimensions of the diameter of the tubular monolith that can be obtained with the usual industrial methods, and flexibility in the design of the geometry and density (number of channels per unitary section) of the longitudinal channels contained therein.

The Applicant has now surprisingly found that the above and other drawbacks can be overcome by resorting to a newly conceived reactor for exothermic or endothermic chemical reactions, preferably carried out in the presence of a catalyst, for example a reactor for the Fischer-Tropsch reaction, comprising a plurality of particular substantially tubular multi-structured elements, having a high thermal conductivity.

In particular, a first object of the present invention relates to a multi-structured tubular element of a reactor for effecting exothermic/endothermic chemical reactions, comprising two or more thermoconductive monolithic bodies extending longitudinally, assembled together so that each has a part of the side surface interfaced, preferably in contact, with the side surface of one or more adjacent thermoconductive monolithic bodies and said two or more assembled monolithic bodies together form a honeycomb structure containing a plurality of longitudinal channels extending from one end to the other of said multi-structured tubular element and substantially parallel to each other and to the main axis of the same element.

Most preferably, the honeycomb structure in the multi-structured tubular element has a substantially uniform distribution of the channels throughout its overall section. In such preferred honeycomb structure all or substantially all the available void room is comprised within the longitudinal channels and is suitable for being filled with a granular or coated catalyst.

A second object of the present invention relates to a reactor for carrying out exothermic/endothermic chemical reactions, comprising at least one multi-structured tubular element as defined above.

Other objects of the present invention relate to a method for producing said multi-structured tubular element and a chemical process carried out in said reactor, preferably a Fischer-Tropsch process for the chemical conversion of synthesis gas to hydrocarbons or oxygenated organic compounds. Further objects will appear evident from the present description and claims.

In general, for the multi-structured tubular element according to the present invention, a main axis is defined, extending in a longitudinal direction, and a transversal section, perpendicular to said axis, which can have various geometrical forms, according to the specific use of the tubular element, ranging from a circular form, which is preferred, to a quadrangular form or even more complex, for example polygonal. The length of the tubular element is normally at least 5 times, preferably from 10 to 1,000 times, more preferably from 50 to 500 times, the main dimension of said transversal section, for example the diameter in the case of a circular section, the larger axis in the case of an elliptic section or diagonal for the square or rectangular section. The transversal section is preferably substantially uniform along the whole length of the multi-structured tubular element.

According to the invention, the length of the multi-structured tubular element is preferably selected in compliance with the length of the reactor in which it is normally inserted when operated, preferably ranging from 0.5 to 20 m, more preferably from 1 to 10 m. The two ends, or heads, of the tubular element can simply consist of a plane having a transversal section. They are normally suitable for being inserted in appropriate supports, for example, a tube plate, for being fixed inside the reactor and can comprise, for example, additional elements or supports suitable for the purpose, according to the known art.

According to the present invention, said tubular element comprises two or more thermoconductive monolithic bodies prevalently extending longitudinally and having two heads or terminal sections, at the opposite ends of each body respectively, and one or more side surfaces, substantially parallel to the longitudinal axis, similar to the cylindrical or prismatic geometrical characteristics. The transversal section of each thermoconductive monolithic body is preferably constant for the whole length. Said two or more monolithic bodies are assembled to form the multi-structured tubular element, so that at least a part of the side surface of each of them is interfaced or, preferably, in contact with that of one or more other adjacent monolithic bodies. The heads or terminal sections of each monolithic body preferably coincide with a part of the respective ends of the tubular element in which it is assembled.

In the preferred case, the thermoconductive monolithic bodies included in a tubular element, have the same length as each other and said length also defines that of the tubular element itself, of which they form the main and prevalent part.

The section of each thermoconductive monolithic body is conveniently designed so that the side surface of the same can be suitably adapted to at least a part of the side surface of one or more of the other adjacent monolithic bodies, with which it is put in contact to form the tubular element of the end-product. The term "adjacent", as used herein with reference to two or more of said thermoconductive bodies, means that the same are positioned parallel in the direction of the length and with the respective side surfaces at least partially interfaced or in contact with each other. The interfaced surfaces are preferably in direct contact with each other, in order to favour a more efficient heat transfer, but, if necessary, they can also be separated by gaskets, coatings or other additional surface elements.

The section, or profile, of each thermoconductive body is such as to allow the formation, in the tubular element, of a honeycomb structure, preferably thermally connected, containing a plurality of channels having suitable dimensions in which the exothermic or endothermic reaction is carried out. A honeycomb structure generally refers to a three-dimensional structure comprising a plurality of longitudinal empty spaces (channels) suitable for being filled with a solid particulate, not necessarily all having a section identical to each other, regularly ordered and parallel and separated from each other by walls made of a thermoconductive material, preferably metallic. The channels of the honeycomb preferably have a segregated flow and do not allow a significant passage of the process fluids through the walls. The transversal section of the longitudinal channels of the tubular element is not limited to a square or rectangular form, but can also have, when required or appropriate, a triangular, polygonal, circular, semi-circular and elliptic form, or a more complex form.

A suitable profile of each thermoconductive monolithic body according to the present invention can, for example, be in the form of a comb, interfaced with a laminar body, possibly suitably grooved in the contact points with the flaps of the comb, so as to form, by consecutive alternating superimposition, square or rectangular tubular elements with a grid section.

A different example of a tubular element according to the present invention consists of two or more circular thermoconductive monolithic bodies hollow inside and concentric with each other, comprising longitudinal channels situated therein, which are inserted in each other so that the outer side wall of the innermost is in contact with the internal side wall of the adjacent outermost circular monolithic body. This arrangement preferably comprises two or at the most three concentric thermoconductive bodies.

Preferred multi-structured tubular elements according to the present invention are those thermally connected, i.e. those in which the various monolithic bodies have such a form and are assembled so as to allow, in any cell of the honeycomb section, heat transfer through the thermoconductive material without discontinuity from or towards the outer surface.

It has also been found that particularly efficient profiles and arrangements of the monolithic bodies for heat conduction are those which allow the side walls of adjacent bodies to be aligned along the thermal flow lines. These lines depend on the geometry of the tubular element. In the case of tubular elements with a cylindrical geometry, the flow lines are preferably arranged radially from the central axis of the cylinder towards the outer wall.

According to a particularly preferred embodiment of the present invention, one or more thermoconductive monolithic bodies of the tubular element comprise at least one longitudinal channel situated in its interior, preferably from 1 to 50, more preferably from 2 to 10 longitudinal channels. In the most preferred case, each monolithic body comprises a plurality of internal channels parallel to each other in turn forming a honeycomb structure.

A part of the side surface of said monolithic body, destined for contact with the adjacent monolithic body or bodies, can be planar or slightly grooved, whereas a second part of the side surface can have a comb structure, i.e. with short flaps or shelves which protrude from the main body, so as to form said longitudinal channels of the tubular element of the reactor, when in contact with said planar part of the side surface of the adjacent body, preferably combined with analogous channels situated inside each monolithic body. In a tubular element thus formed, the interfaced side surfaces of monolithic bodies adjacent to each other, are in thermal communication only in the contact areas of the comb structure with the conductive surface opposite it, but the heat transfer is efficiently guaranteed by the presence of continuous conduction lines towards the outer wall in each thermoconductive monolithic body.

In a different embodiment of the present invention, each thermoconductive monolithic body has at least one, preferably at least two, substantially planar wall, preferably smooth, destined for being engaged, in the tubular element, with the corresponding smooth wall of at least a second thermoconductive body.

Figure 5:
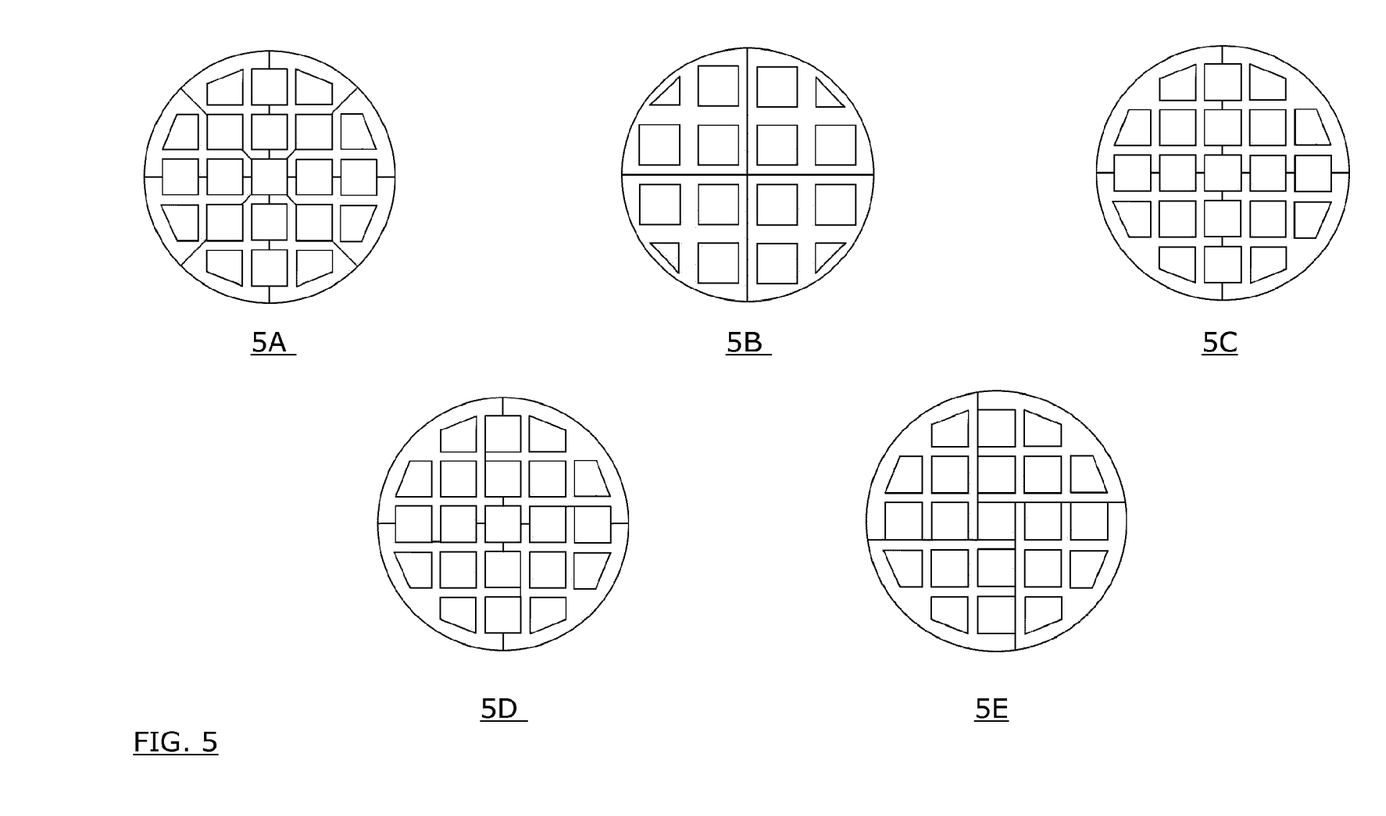
FIG. 5 schematically shows, for purely illustrative purposes, 5 possible sections of variants of the multi-structured tubular element of the present invention, in which the forms and assembly modes of the monolithic bodies forming it, can be distinguished.

Numerous structures of monolithic bodies can satisfy the above preferred requirements. Some sections of tubular elements according to these are shown, for purely illustrative and non-limiting purposes, and without reference to the real dimensions, in FIG. 5 enclosed herewith.

The thermoconductive monolithic bodies preferably all have the same section, uniform for the whole length, thus representing an advantageous simplification of their production process.

Furthermore, each monolithic body of the multi-structured tubular element is more preferably thermally connected with the outer surface. In this preferred case, each thermoconductive monolithic body comprises at least one wall which is part of the outer side surface of the multi-structured tubular element in which it is contained and forms from 5 to 80%, even more preferably from 10 to 50% of said surface.

In the most preferred embodiment, the multi-structured tubular element of the present invention is substantially cylindrical and comprises from 3 to 6 monolithic bodies having the same section with a form similar to a circular section.

The multi-structured tubular element of the present invention can therefore have, for example, a section as illustrated in FIG. 5A, comprising honeycomb thermoconductive monolithic bodies with a comb profile with outer flaps for the formation of further channels, or a section as shown in FIG. 5B, in which the monolithic bodies have at least one substantially smooth wall which corresponds with that of a second body adjacent thereto.

On the whole, the spatial density of the longitudinal channels contained in the multi-structured tubular element is such that the section of the same comprises on average from 1 to 50, more preferably from 3 to 30, cells per $cm^2$.

Numerous other combinations of thermoconductive monolithic bodies with different structures and profiles are obviously possible, depending on the final destination of the tubular element of the reactor, all however corresponding to the concept of a combination of various thermoconductive elements forming a multi-structured tubular element of a reactor, as expressed according to the invention.

In order to effectively transfer the heat emitted or absorbed during the reactive processes carried out in the channels of said multi-structured tubular element, the material of which each thermoconductive body is manufactured is characterized by a relatively high thermal conductivity, preferably an intrinsic thermal conductivity equal to or higher than 10 W/m/K, more preferably ranging from 100 to 400 W/m/K. For reasons of dimensional stability at the reaction temperatures, the material is selected, for example, from metals such as steel, copper, aluminium or aluminium alloy. The metal is preferably aluminium or aluminium alloy. Alternatively, thermally conductive ceramic materials can be used, such as silicon carbide. The material is selected by an expert in the field, also taking into consideration the type of reaction fluids with which the tubular element will come into contact, in particular using chemically inert materials and resistant to corrosion or treated on the surface with an anti-corrosive coating, if the reaction fluids are chemically aggressive. Thermoconductive materials chemically inert towards the components of the process fluid with which they come into contact, are also preferred.

The section of the multi-structured tubular element according to the present invention preferably has a maximum dimension ranging from 10 to 100 mm, more preferably from 20 to 50 mm. The honeycomb structure contained therein is preferably composed of a plurality of longitudinal channels, with a transversal section which can be square, rectangular, trapezoidal or rhomboidal, having a length of the sides ranging from 0.5 to 10 mm, partly formed in the continuous structure of each thermoconductive monolithic body and partly in the interface area between walls of adjacent monolithic bodies, when these are structured with flaps as previously described. The multi-structured tubular element thus obtained is suitable for transferring heat from or towards the outside with an efficiency substantially equal to that of a monolithic element having analogous dimensions and distribution of longitudinal channels, but it can be advantageously produced by assembling thermoconductive monolithic bodies having forms and dimensions which are easier to manufacture with the usual industrial technologies such as, for example, electro-erosion, perforation or extrusion, the latter being particularly preferred. There is, moreover, a significant flexibility for managing the whole construction and assembly process of the monolithic bodies for producing the corresponding tubular element, which can therefore be adapted to numerous processes and conditions of use.

Preferably, the walls which separate the longitudinal channels in the honeycomb multistructure have a thickness which is sufficient for providing adequate mechanical and thermal properties. In particular, they must appropriately have a mechanical resistance which is sufficient for allowing the production of monolithic bodies and their assembly, especially in the preferred case in which the multi-structured tubular element is sheathed by means of drawing, as illustrated hereunder.

Furthermore, the thickness of the walls must be such as to allow the transfer of a sufficient quantity of heat from or towards the innermost longitudinal channels, but not too high so as not to excessively reduce the transversal section of the same channels and therefore the void fraction available for being filled with catalyst in the end-product. The thickness of the walls is generally calculated taking into consideration the thermal conductivity and other properties of the material used, with methods known to experts in the field. In the preferred case of a tubular element made of aluminium or aluminium alloy, the thickness of the internal walls between the channels in the honeycomb structure preferably ranges from 0.1 to 2 mm, preferably from 0.5 to 1.5 mm. The present invention also comprises multi-structured tubular elements in which the thickness of the internal walls between the channels is not uniform but can, for example, increase, again within the above limits, from the centre towards the outside, for a more efficient radial heat transfer.

The desired exothermic or endothermic reaction takes place inside each channel of the multi-structured tubular element of the present invention. For this purpose, the mixture of reactants flows from one end to the other of each channel in the honeycomb structure, where it is kept at the correct reaction temperature by means of thermal exchange with the thermoregulation fluid in contact with the outer wall of the multi-structured tubular element. Although the tubular element and corresponding reactor can be conveniently used, in principle, for effecting any chemical reaction, also non-catalyzed, or in the presence of a homogeneous catalyst dissolved in the same reaction mixture, said tubular element is preferably used for reactions in the presence of a solid catalyst. In this case, in order to obtain the maximum concentration possible of catalyst and maximum solid catalytic surface in contact with the reaction mixture, the catalyst is distributed in the longitudinal channels in the form of packed granular bodies (for example, spheres, cylinders, rings, etc.) or structured bodies (for example, solid foams, gauzes, nets, etc.) so as to obtain a fill factor, catalyst Volume/longitudinal channel Volume, ranging from 0.10 to 0.75, preferably from 0.40 to 0.65. The dimensions of the granular bodies of catalyst and their distribution are selected by an expert in the field according to known criteria, on the basis of the catalytic performances desired. The main dimension of said granular bodies generally ranges from 30 µm to 3,000 µm, preferably from 100 µm to 1,000 µm, and in any case such as to allow the granules to be easily charged into the longitudinal channels of the tubular element. With this arrangement of the catalyst, an excellent compromise can be obtained between the pressure drops of the streams flowing in the reactor, the availability of adequate quantities of catalyst per volume unit of the reactor and an efficient reaction heat removal thanks to the continuous conductive monolithic structure of each thermoconductive monolithic body. A further object of the present invention therefore relates to said honeycomb multi-structured tubular element, as such or sheathed, whose channels are partially or totally filled with a granular solid acting as catalyst.

The multi-structured tubular element according to the present invention can be produced starting from the corresponding thermoconductive monolithic bodies using assembly methods known in the art and suitably adapted by an expert in the field.

Each thermoconductive monolithic body can be produced using, for example, the industrial techniques already mentioned above such as, for example, electro-erosion, perforation and preferably extrusion, for whose embodiment reference should be made in the numerous technical manuals and volumes available in literature. In particular, a detailed description of the extrusion technique of metal profiles, especially those made of aluminium, that can be applied to the embodiment of the present invention, can be found, for example, in the volume P. Saha, "Aluminum extrusion technology", ASM International Ed. (2000), or in M. Bauser, G. Sauer, K. Siegert, "Extrusion", ASM International Ed. (2006). Their production by extrusion has the further advantage of allowing a continuous process, extruding a profile which is then cut into the desired size for obtaining the monolithic bodies of the present invention. If the thermoconductive monolithic bodies forming each tubular element all have the same form (see FIG. 5, for example), the same can be produced using a single profile of the extruder head.

The monolithic bodies thus obtained are suitably assembled according to the respective geometrical correspondences along their side surfaces, as envisaged in the design phase, so as to obtain the desired multi-structured tubular element. Various methods, known to experts in the field, can be used for the assembly. The monolithic bodies, for example, can be welded to each other along certain contact lines, or they can be wedge-inserted to form self-sustaining structures, if the geometry of the same is suitable for this solution, or joined by means of suitable supports, such as tapes, sheaths or other means.

According to a preferred embodiment of the present invention, the tubular element of the present invention can be produced by the insertion of the thermoconductive monolithic bodies, more preferably by means of the drawing technique, in a tubular sheath suitable for adapting itself to the outer side surface of the same element. In this case, the outer sheath is preferably composed of a metal having a good thermal conductivity and satisfactory mechanical properties, such as aluminium or steel, especially stainless steel. The drawing technique allows the further advantages of producing a close contact between the internal surface of the tubular sheath and the outer surface of the multi-structured tubular element, in order to optimize the thermal exchange between the two surfaces.

A further object of the present invention therefore relates to a multi-structured tubular element also comprising a thermoconductive tubular sheath, preferably metallic, either totally or partially positioned on the outer side surface of the same. Said outer sheath preferably has a thickness ranging from 0.5 to 10 mm, more preferably from 1 to 4 mm, and substantially covers the whole of the tubular element.

According to a typical non-limiting production example of a sheathed multi-structured tubular element by means of drawing, a cylindrical steel tube (for example made of stainless steel or carbon steel) is used as outer tubular sheath, having an internal diameter corresponding to or slightly greater than the outer diameter of the tubular element, and tolerances that fall within the standard values. Said tube is suitably cleaned, on the internal wall, of any foreign material deriving from previous mechanical processings, and preferably also of possible traces of lubricants or analogous products. The multi-structured tubular element composed of thermoconductive monolithic bodies, preferably made of aluminium, suitably preassembled in a cylindrical form (for example by means of gluing or wedge-insertion), is then introduced into the tube.

In order to facilitate the insertion of the multi-structured tubular element into the outer tube, the latter can possibly be preheated, completely or at least in the part close to the inlet. The two elements thus combined are then subjected to further mechanical drawing processing according to the known techniques, at temperatures ranging from 20 to 200° C., preferably at room temperature or slightly higher, during which the outer tube is plastically deformed by compression until a close contact is obtained between its inner surface and the corresponding outer surface of the tubular element, so as to reduce the thermal resistance due to the discontinuity between the two surfaces, to the minimum. A permanent fixing of the multi-structured tubular element is thus obtained, which is extremely stable dimensionally and with an excellent thermal conductivity from or towards the surface of the outer tubular sheath.

The contact level in this case is optimum, considering the fact that when operating, the multi-structured tubular element made of aluminium is heated with a greater expansion coefficient of the outer steel jacket.

In the preferred case in which the multi-structured tubular element of the present invention is used for effecting exothermic or endothermic reactions in the presence of a solid granular catalyst, one or more longitudinal channels, more preferably each longitudinal channel, present in the same, is suitably loaded according to the procedures generally known for loading the catalyst into reactors comprising honeycomb structures. Each tubular element present in a reactor can be charged separately, before insertion into the same reactor.

The particle-size of the catalyst is conveniently selected so that it has a narrow distribution, i.e. is as homogeneous as possible. The dimensions are conveniently selected so as to allow an easy flow in the channels and a uniform filling thereof, at the same allowing the flow of the reaction mixture without high pressure drops, preferably lower than 20% of the inlet pressure.

The filling can be effected, for example, using a hopper with a flexible tube into which a pre-established quantity of catalyst is loaded, substantially identical for all the tubular elements. The flow of the catalyst in the longitudinal channels contained in the tubular element can be facilitated by a pneumatic-type transportation and/or with the help of suitable vibration tools.

The multi-structured tubular element thus formed and possibly sheathed and charged with the granular catalyst (or, alternatively, coated with a practically uniform layer of catalyst on the walls of the longitudinal channels), is ready to be introduced into the reactor for effecting exothermic or endothermic reactions, preferably catalyzed.

A further object of the present invention relates to a reactor (1) for carrying out exothermic/endothermic chemical reactions preferably in the presence of a solid catalyst, which comprises:
(a) a substantially cylindrical vessel (A) or having a similar form, provided with feeding and discharge means (2) (3) of a thermoregulation fluid of the chemical reaction;
(b) an upper closing element (B1) and a lower closing element (B2) respectively positioned at the head and base of the vessel;
(c) feeding means of the reacting mixture positioned (4) in the upper closing element (B1) or (5) in the lower closing element (B2);
(d) discharge means of the reacted phase positioned (5) in the lower closing element or (4) in the upper closing element;
(e) at least one multi-structured tubular element (7) according to the present invention, as such or preferably sheathed, positioned inside the container (A) between the upper closing element (B1) and the lower closing element (B2).

The reactor, object of the present invention, is particularly and preferably suitable for the Fischer-Tropsch reaction which is developed in a three-phase system essentially consisting of a reacting gaseous phase, a reacted liquid phase and a catalytic solid phase consisting of packed bodies (for example, spheres, cylinders, rings, etc.) or structured bodies (for example foams, gauzes, nets, etc.) inserted inside the longitudinal channels of said at least one tubular reactor element.

According to the present invention, the vessel (A) is substantially cylindrical and can be a vessel having any dimensions but is preferably characterized by a variable height, for example, ranging from 0.5 to 20 m, preferably from 1 to 10 m, and a diameter ranging from 1 to 15 m, more preferably from 4 to 10 m. Similar forms, according to the present invention, can be parallelepiped or prismatic forms. Said vessel, as also the upper and lower closing elements, are generally made of carbon steel or corrosion-resistant steel, i.e. alloy steel bound with one or more metals selected from those of Groups 5-10, such as, for example, vanadium, niobium, chromium, molybdenum, tungsten, manganese, nickel. The thicknesses of the wall of the container (a) and closing elements (b) depend on the temperature and pressure at which the reaction takes place, but they can generally range from 10 to 100 mm, more preferably from 20 to 80 mm. The reactor, object of the present invention, when in use, is preferably positioned vertically.

The length of each multi-structured tubular element corresponds to the length of the substantially cylindrical vessel (a) of the reactor in which it is inserted. There is also the possibility, however, and this is part of the invention, that more multi-structured tubular elements, having a shorter length, are connected to each other and stacked in a longitudinal direction to form a tubular structure having the desired length, possibly sheathed according to one of the above-mentioned techniques, with a continuous tubular sheath along the whole tubular structure.

In the preferred case, in which the reactor according to the present invention comprises multi-structured tubular elements whose longitudinal channels are filled with solid granular catalyst, the overall dimensions necessary for reaching the desired productivity are considerably reduced with respect to traditional honeycomb monolithic reactors, such as, for example, those described in U.S. Pat. No. 6,881,703, in which the catalyst is deposited on the walls of the channels. Thanks to the high charge of catalyst that can be inserted into the reactor and efficient heat transfer capacity of each thermoconductive body assembled in each tubular element, the exothermic/endothermic reaction, particularly the Fischer-Tropsch reaction, can in fact be carried out under high specific productivity conditions (productivity per volume unit of the reactor). The size of the reactor of the present invention, with the same type of catalytic material and overall productivity with respect to a traditional reactor of the "washcoated" type can therefore be significantly reduced, in certain cases even over 12 times. This characteristics advantageously allows high productivity reactors to be obtained with a reduced volume which do not need to be assembled in situ and can be positioned onboard ships and/or specific land movement means to be transported to remote positions where there are raw materials for synthesis gas, for example offshore and/or onshore natural gas reservoirs, which do not make the use of large-dimensioned reactors, for example Slurry Bubble Column reactors or fixed-bed reactors that is multi-tubular reactors with traditional monolithic catalysts (washcoated), either convenient or possible.

At least one multi-structured tubular element, possibly sheathed, is inserted inside the substantially cylindrical container, according to what has been previously described. Normally, however, in industrial reactors, there is a relatively high number of tubular elements, forming a tube-bundle, suitably spaced from each other to allow an adequate circulation of the fluid thermoregulating the reaction temperature, for example water with production of steam in the case of exothermic reactions, or pressurized steam in the case of endothermic reactions. Alternatively, the thermoregulation of the reactor can be effected with other fluids, for example diathermic oil. The tube-bundle is preferably distributed in the whole space available inside the cylindrical vessel (a), and occupies a volume ranging from 40 to 90% of the total volume of the same container, more preferably from 50 to 80%.

The tube-bundle normally comprises a number of multi-structured tubular elements ranging from 10 to 20,000, preferably from 100 to 15,000, more preferably from 1,000 to 12,000. The average distance between adjacent tubular elements (from side surface to side surface) is established by an expert in the field on the basis of the number and size of the elements themselves, and also on the basis of the heat flow and the flow of the exchanger fluid, according to normal project criteria, and preferably ranges from 10 mm to 60 mm.

The multi-structured tubular elements, possibly sheathed, preferably with a circular section and more preferably comprising 3 or 4 thermoconductive monolithic bodies, are usually supported on perforated metallic plates (6), preferably of the same material forming the cylindrical container and ends of the reactor, according to known procedures for similar tube-bundle structures. Said plates (6), called tube plates according to their use, are perforated transversal septa, positioned close to the upper and lower closing elements (caps) of the reactor, seal- and force-welded on the walls of the cylindrical vessel, in which the ends of the tubular elements of the bundle are inserted and seal-fixed. The thickness of each tube plate, preferably ranging from 30 to 400 mm depending on the diameter of the reactor, more preferably from 100 to 300 mm in Fischer-Tropsch synthesis reactors, is adequate for supporting the pressure differences. In this way, when operating, the feeding streams of the reactants are channeled in the multi-structured tubular elements, where the reaction takes place, and the products are then collected and removed at the outlet, without there being any mixing or loss of fluids towards the thermoregulation fluid which is circulating in the mantle side in the cylindrical container.

In order to obtain an effective confinement of the catalyst present in the channels of each tubular element, the reactor is preferably equipped with a suitable porous or fibrous septum positioned at least at the end of the tubular elements facing downwards. Alternatively, each tubular element can be provided at at least one end, preferably at the outlet end of the reaction fluid, with a porous or fibrous septum.

In both of the above cases, the materials of which the septum is formed, are preferably selected from those commercially available for the purpose, provided they have adequate chemical inertia characteristics and a sufficiently fine porosity for withholding the catalyst, for example, metallic nets, thin sheets of metallic sponges, open-pore foams, mats composed of layers of metallic wire mesh.

The reactor according to the present invention can be produced according to the usual mechanical and metallurgical processing techniques known to experts in the field. In the preferred case in which the tubular elements of the tube-bundle are sheathed as previously described, with a coaxial metallic tubular sheath, the fixing on the tube plate is preferably obtained by welding of the metallic sheath.

The reactor, object of the present invention, can be used, in particular, for exothermic catalytic reactions, such as the Fischer-Tropsch reaction where a reacting gaseous phase, consisting of a mixture of CO and $H_2$ (synthesis gas), flows in contact with a substantially fixed bed of catalyst for example in the form of granules, creating a liquid phase, at the reaction temperature and pressure, composed of paraffinic waxes and a vapour phase, prevalently consisting of $C_1$-$C_{25}$ hydrocarbons.

In particular, the reactor for Fischer-Tropsch-type reactions is a reactor in which chemical reactions take place, which develop in three-phase systems in which a gaseous/vapour phase flows in contact with the solid phase and generates a vapour phase and a liquid phase which wets the catalyst. In the present case, the gaseous/vapour phase essentially consists of synthesis gas and light reaction products, the vapour/liquid phase is the heavy reaction product, i.e. hydrocarbons essentially with a high number of carbon atoms, and the solid phase is represented by the catalyst.

The synthesis gas preferably comes from steam reforming and/or the partial oxidation of natural gas or other hydrocarbons, on the basis of the reactions described, for example, in U.S. Pat. No. 5,645,613. Alternatively, the synthesis gas can come from other production techniques such as, for example, from autothermal reforming processes, steam reforming processes, C.P.O. (Catalytic Partial Oxidation) of hydrocarbons, or from the gasification of coal, biomasses, or other carbonaceous products, with high-temperature steam, as described, for example in "Catalysis Science and Technology", vol. 1, Springer-Verlag, New York, 1981.

The products that can obtained with the Fischer-Tropsch process are substantially divided into two phases, under the usual operating conditions of the reactor. A lighter vapour phase, essentially consisting of a mixture of hydrocarbons with a number of carbon atoms ranging from 1 to 10, and reaction by-products, such as water vapour, $CO_2$, alcohols, etc. This phase includes the $C_5$-$C_{10}$ fraction, having a boiling point at normal pressure equal to or lower than 150° C. The second phase produced essentially consists of paraffinic waxes, liquid at the reaction temperature, comprising, depending on the process and catalyst used, mixtures of linear or branched hydrocarbons, preferably linear, saturated or unsaturated, with a high number of carbon atoms. These are generally hydrocarbon mixtures having a boiling point, at normal pressure, higher than 150° C., for example ranging from 160 to 650° C. (upper limit extrapolated from data at reduced pressure). With cobalt catalysts, a mixture of linear waxes, solid at room temperature, is normally produced.

The Fischer-Tropsch reaction is conveniently carried out at temperatures equal to or higher than 150° C., for example ranging from 200 to 350° C., maintaining a pressure ranging from 0.5 to 30 MPa inside the reactor. Most significant details on the Fischer-Tropsch reaction are available in "Catalysis Science and Technology" mentioned above.

The catalyst is generally based on cobalt or iron supported on an inert solid. The catalyst, which is preferably adapted to the reactor according to the present invention, is based on cobalt dispersed on a solid carrier consisting of at least one oxide selected from one or more of the following elements: Si, Ti, Al, Zr, Mg. Preferred carriers are silica, alumina or titania. A suitable preferred carrier, different from the above oxides can be silicon carbide.

The cobalt is present in the catalyst in a quantity ranging from 1 to 50% by weight, generally from 5 to 35%, with respect to the total weight. The catalyst used can also comprise further additional elements. It can comprise, for example, with respect to the total weight, from 0.05 to 5% by weight, preferably from 0.1 to 3%, of ruthenium or tantalum, and from 0.05 to 5% by weight, preferably from 0.1 to 3%, of at least a third element selected from those belonging to group 3 (IUPAC standard). Catalysts of this type are known in literature and described, together with their preparation, for example, in European patent 756,895.

The catalyst, whatever its chemical composition may be, is used in structured or particle form, for example in the form of spherical granules having an average dimension lower than 3 mm, preferably ranging from 0.1 to 1 mm.

According to the known techniques, generally for carrying out the Fischer-Tropsch reaction, the granular catalyst loaded into the longitudinal channels is in the form of an oxidized or passivated precursor and must be subjected to a reduction process, normally with hydrogen, before feeding the synthesis gas reactants.

For a better understanding of the reactor for exothermic/endothermic chemical reactions, object of the present invention, reference is made to the drawings of the enclosed Figures which represent an illustrative and non-limiting embodiment. In particular, the drawing of FIG. 1 schematically represents a longitudinal section of the reactor, whereas drawing 2 schematically represents a section of the multi-structured tubular element of the reactor according to the present invention.

Figure 1:
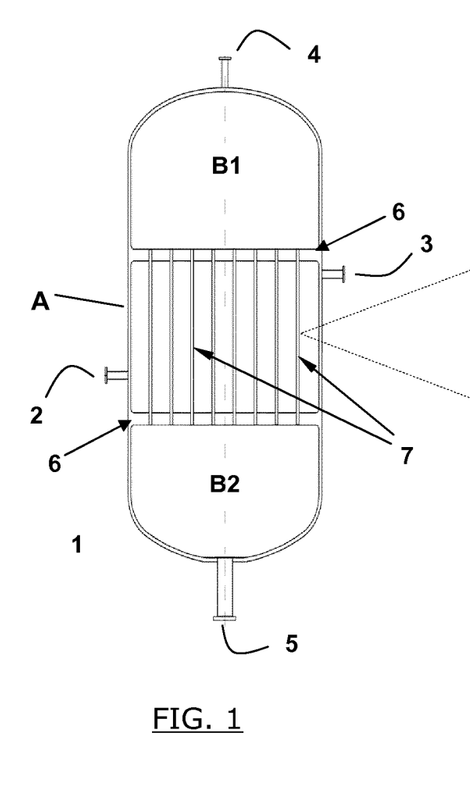

According to FIG. 1, the reactor (1) is essentially composed of a cylindrical vessel (A) and two closing elements (B1) and (B2). The closing elements (B1) and (B2) are respectively provided with a line (4) and a line (5) which, depending on the use of the reactor and direction of the flows, can either be for the inlet of the reagents or outlet of the reaction products. In the cylindrical body (A), there is also an inlet line (2) and an outlet line (3) of the thermoregulation fluid of the chemical reaction involved. Alternatively, also in this case, the inlet and outlet can be inverted in relation to the desired thermal exchange mode, whether the flow is equicurrent or countercurrent with respect to the direction of the flow of reaction fluid.

Figure 2:
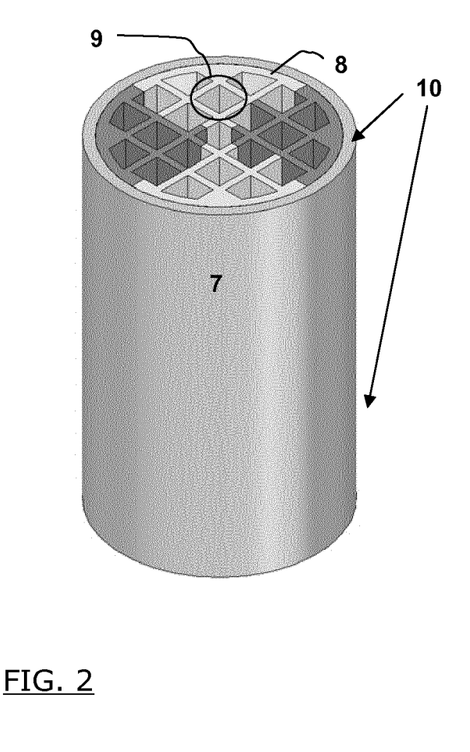
Figures 3, 4:
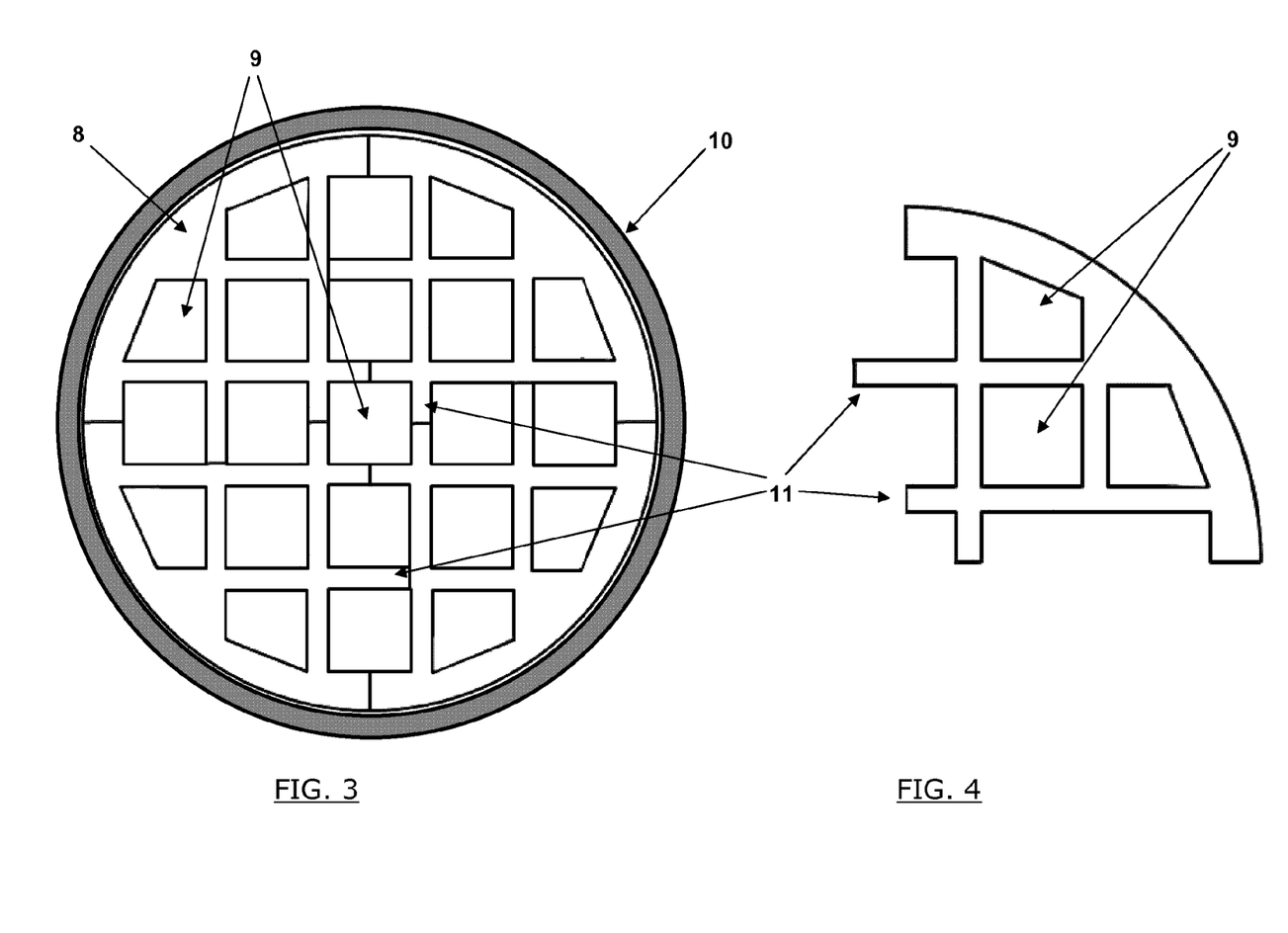
FIGS. 3 and 4 represent details of the transversal section of a tubular element, object of the present invention, and one of the four thermoconductive monolithic bodies forming it.

The tube-bundle is positioned inside the cylindrical vessel (A), said tube-bundle being composed of multi-structured tubular elements (7), inserted, by the respective ends, in the tube plates (6), which is represented in detail, for a single element, in the drawings of FIGS. 2 to 4.

FIG. 2 illustrates an enlarged section of a multi-structured tubular element (7), which, in the case exemplified herein, is composed of four thermoconductive monolithic bodies (8), the same as each other, and having a form which is such as to perfectly correspond to a part of their partially flapped side surfaces, forming a cylindrical body comprising a plurality of longitudinal channels (9) forming a honeycomb structure. FIG. 2 also illustrates an outer covering sheath (10), preferably consisting of a metal, for example stainless steel, with good mechanical performances and a good resistance to corrosion, which is in close contact, obtained by means of drawing, with the outer surface of the tubular element, thus avoiding the formation of thermal barriers and discontinuity points at the tube-coating interface.

FIG. 3 shows, in the schematic view of its transversal section, some details of the tubular element (7) perspectively represented in FIG. 2, before the channels present therein are possibly filled with solid catalyst. The four monolithic bodies (8) can be clearly seen, having a form which is approximately a fourth of the cylinder with two sides having an irregular geometry and a semicircular wall, assembled adjacently so as to form an overall compact circular cylindrical structure in which there are a plurality of square-shaped or trapezoidal cells, corresponding to the longitudinal channels (9). The section of the tubular element (7) is enclosed inside a circular crown which represents the section of a metallic tubular sheath (10), in which the multi-structured tubular element is preferably inserted, having the double function of contributing to maintaining the fixed position of the various monolithic bodies (8) and in any case allowing a sufficiently effective heat transfer. The internal surface of the tubular sheath (10), preferably positioned by means of drawing techniques, adheres perfectly to the outer side surface of the multi-structured tubular element, even if in FIG. 3, for greater clarity, the two walls appear separated by a thin spacing.

Some of the walls which separate the channels (9) from each other, close to the side edge of the section of each thermoconductive monolithic body (8), can be extended by a section, whose length is selected by the designer on the basis of usual criteria of production and assembly. In the case of the tubular element schematically represented in FIG. 3, the sections of wall are extended for a length which can be approximately equal to the side of the same channels or about half of the same, to form a structural element which can be defined in common terminology as a shelf or flap (11), suitable to correspond with the respective extensions or sections of side wall of the adjacent monolithic body(ies).

In this way, the thermoconductive monolithic bodies (8), once assembled in the multi-structured tubular element (7), form further channels (9) destined for being filled with catalyst.

The functioning of the reactor, for example, for exothermic Fischer-Tropsch reaction, is evident from the above description and drawings. Once the catalyst has been loaded into the channels (9) of the tubular elements (7), synthesis gas is fed, for example through the upper inlet duct (4). Flowing inside the channels filled with monolithic structures, the reacting gases come into contact with the catalyst and react, forming the vapour/liquid phase, essentially consisting of high-molecular-weight paraffinic waxes. The reaction product is discharged through the outlet duct (5) together with the reaction by-products, hydrocarbon gas/vapours and non-converted reagents. During the reaction, there is the production of heat which is removed by means of a cooling fluid fed and discharged through (2) and (3). Thanks to the monolithic structure and thermally conductive material with which the thermoconductive bodies are produced, the reaction heat is transferred by conduction to the cooling fluid with a higher efficiency than that of a traditional fixed-bed reactor.

In order to illustrate the improved construction flexibility and maintenance of a high heat exchange efficiency, which can be obtained with a reactor based on the tubular elements according to the present invention, an applicative example is proposed hereunder, provided for purely illustrative and non-limiting purposes of the invention.

EXAMPLE

A sheathed honeycomb multi-structured tubular element made of aluminium is prepared, having a length of 1 meter with a circular section as represented in FIG. 3, having an outer diameter equal to 28 mm (excluding the tubular sheath (10)) and an average cell density of 3.4 cells per square centimeter, comprising longitudinal channels (9) having a square or trapezoidal section close to the outer side surface, whose side size is about 4 mm. The longitudinal channels are separated by aluminium walls having a thickness of about 1.2 mm.

The tubular element is obtained by assembling four aluminium monolithic bodies, the same as each other, each with a length of 1 m, having the section represented in FIG. 4. Each monolithic body comprises three longitudinal channels and various flaps (11) suitably positioned along the two straight sides, as schematically represented in the section of FIG. 4, so as to form additional longitudinal channels once the four monolithic bodies have been assembled to form the tubular element.

The monolithic bodies were obtained by extruding an aluminium profile having a length of 5 meters through a head shaped according to the desired geometry of FIG. 4, and then cutting the four bodies to the desired length of 1 m. The monolithic bodies, carefully cleaned of any trace of dust and metallic shavings, were subsequently assembled by interfacing the respective orthogonal sides and externally leaving the side surface semi-cylindrical, forming a multi-structured tubular element, which was then fixed definitely by means of drawing with a steel tubular sheath having a thickness of about 3 mm. For this purpose, a stainless steel tube was prepared, having a length of 1 m, with an internal diameter of 29 mm and a thickness of 3 mm, in which the above preassembled tubular element was inserted. The end-product thus prepared was then drawn by means of mechanical compression at room temperature in a suitably prepared wire drawing machine. A sheathed multi-structured tubular element was obtained, whose longitudinal channels were not significantly modified with respect to the original form and dimensions. A substantial adherence was verified at the interface between the outer surface of the aluminium tubular element and the internal wall of the steel sheath, without any apparent spatial discontinuity.

The channels of the sheathed tubular element thus obtained, having an overall void fraction equal to 0.5, were filled with a catalyst for Fischer-Tropsch synthesis based on cobalt supported on alumina (in the state of oxidized precursor) in particulate form with a surface area of 80 $m^2/g$, a narrow distribution, having an average diameter of 340 μm and a substantial absence of fine products with a diameter <140 μm, whose Co content was 15% by weight. The catalyst was charged using a hopper having a flexible tube and applying a vibration system to favour the packing, obtaining a filling ratio of 0.60.

The multi-structured tubular element charged with the catalyst was inserted in a mono-tubular reactor cooled with an outer jacket, having a diameter of 150 mm with circulation of diathermic oil.

After the initial reduction phase in a stream of hydrogen, the reactor was run with a pressure at the head equal to 20 bar, feeding 4,000 $Ncm^3/h/g_{cat}$ of a mixture of CO and $H_2$ preheated to 227.5° C. and having a ratio between the two species equal to 2.1 moles of $H_2$ per mole of CO. The cooling agent was maintained at a constant temperature of 227.5° C.

The total specific productivity to hydrocarbons (C1+) of this reactor is equal to 301 $kg/h/m^3$ and the pressure drops are 0.14 bar. Over 90% of the hydrocarbon product consisted of C5+ hydrocarbons.

In spite of the extremely high productivity and structure with honeycomb sections, the temperature profile of the tubular element, measured with suitably prepared probes, has a temperature difference between internal and peripheral areas of the transversal section, always limited to below 2° C., and deviates from the cooling temperature by not more than 6° C. (Tmax=234° C.)

Other embodiments of the present invention, different from those specifically described above, are possible, however, and simply represent obvious variants in any case included in the scope of the following claims.

The invention claimed is:

1. A multi-structured tubular element of a reactor for effecting exothermic/endothermic chemical reactions, comprising two or more monolithic thermoconductive bodies extending longitudinally, assembled together so that each has a part of a side surface in contact with a side surface of one or more of said monolithic thermoconductive bodies adjacent thereto and said two or more monolithic thermoconductive bodies together form a thermally connected honeycomb structure containing a plurality of longitudinal channels extending from one end to the other of said multi-structured tubular element and substantially parallel to each other and to a main axis of said multi-structured tubular element, wherein each of said monolithic thermoconductive bodies has a thermal conductivity higher than 10 w/m/K and is thermally connected with an outer side surface of the multi-structured tubular element, wherein each of said monolithic thermoconductive bodies comprises a wall that is part of the outer side surface of the multi-structured tubular element, and comprising a catalyst in the form of granular bodies filled in at least one of the plurality of longitudinal channels.

2. The tubular element according to claim 1, having a substantially cylindrical form.

3. The tubular element according to claim 1, comprising from 3 to 6 of said monolithic thermoconductive bodies.

4. The tubular element according to claim 1, whose length ranges from 0.5 to 20 m.

5. The tubular element according to claim 1, wherein each of said monolithic thermoconductive bodies comprises at least one longitudinal channel situated in its interior, in turn forming a honeycomb structure.

6. The tubular element according to claim 1, wherein the part of the side surface of said monolithic thermoconductive body in contact with the adjacent body or bodies, is planar or slightly grooved, whereas a second part of the side surface has a structure comprising shelves or flaps.

7. The tubular element according to claim 1, wherein the spatial density of the longitudinal channels is such that the section of the same comprises on average from 1 to 50 cells per $cm^2$.

8. The tubular element according to claim 1, wherein said monolithic thermoconductive bodies are comprised of a material selected from steel, copper, aluminum or an aluminium alloy.

9. The tubular element according to claim 1, whose section has a maximum dimension ranging from 10 to 100 mm.

10. A sheathed honeycomb multi-structured tubular element comprising the tubular element according to claim 1 and a tubular thermoconductive sheath positioned totally or partly on the outer side surface of the tubular element.

11. The sheathed honeycomb multi-structured tubular element according to claim 10, wherein said tubular thermoconductive sheath is positioned in direct contact with the outer side surface of the tubular element by means of drawing.

12. The sheathed honeycomb multi-structured tubular element according to claim 10, wherein said tubular thermoconductive sheath is made of steel or stainless steel.

13. A method for the production of a tubular element of a reactor according to claim 1, comprising the assembly of two or more of the monolithic thermoconductive bodies having two heads or terminal sections, respectively at the opposite ends of each body and one or more of the side surfaces, substantially parallel to the longitudinal axis, so that at least a part of the side surface of each monolithic body is in contact with that of one or more other monolithic bodies, forming together the honeycomb structure containing a plurality of the longitudinal channels extending from one end to the other of said multi-structured tubular element and substantially parallel to each other and to the main axis of the same element.

14. The method according to claim 13, wherein each monolithic thermoconductive body comprises at least one longitudinal channel positioned in its interior in turn forming a honeycomb structure.

15. The method according to claim 13, wherein said one or more monolithic thermoconductive bodies are produced by means of the extrusion technique.

16. The method according to claim 13, additionally comprising a drawing step whereby a thermoconductive tubular sheath is positioned on the outer side surface of said multi-structured tubular element of a reactor.

17. A method of using the multi-structured tubular element of a reactor according to claim 1, comprising carrying out exothermic or endothermic reactions with said reactor.

18. The method according to claim 17 comprising carrying out a Fischer-Tropsch reaction.

19. A reactor for effecting exothermic/endothermic chemical reactions comprising:
   a. a substantially cylindrical vessel or having a similar form, provided with feeding and discharge means of a thermoregulation fluid of the chemical reaction;
   b. an upper closing element and a lower closing element respectively positioned at the head and base of the vessel;
   c. feeding means of the reagent mixture positioned in the upper closing element or in the lower closing element;
   d. discharge means of the reacted phase positioned in the lower closing element or in the upper closing element;
   e. at least one multi-structured tubular element according to claim 1, as such or sheathed, positioned inside the container between the upper closing element and the lower closing element.

20. A reactor according to the claim 19, wherein said exothermic/endothermic reaction is carried out in the presence of a solid granular catalyst.

* * * * *